(12) United States Patent
Cojocaru et al.

(10) Patent No.: US 10,450,657 B2
(45) Date of Patent: Oct. 22, 2019

(54) ELECTRODE-FORMING COMPOSITION

(71) Applicant: SOLVAY SPECIALTY POLYMERS ITALY S.P.A., Bollate (IT)

(72) Inventors: Paula Cojocaru, Legnano (IT); Francesco Maria Triulzi, Garbagnate Milanese (IT); Marco Apostolo, Senago (IT); Maurizio Biso, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 15 days.

(21) Appl. No.: 15/536,128

(22) PCT Filed: Dec. 18, 2015

(86) PCT No.: PCT/EP2015/080628
§ 371 (c)(1),
(2) Date: Jun. 14, 2017

(87) PCT Pub. No.: WO2016/097360
PCT Pub. Date: Jun. 23, 2016

(65) Prior Publication Data
US 2017/0350015 A1 Dec. 7, 2017

(30) Foreign Application Priority Data

Dec. 19, 2014 (EP) .................................... 14199484

(51) Int. Cl.
*H01M 4/04* (2006.01)
*H01M 4/131* (2010.01)
(Continued)

(52) U.S. Cl.
CPC ...... *C23C 18/1875* (2013.01); *C23C 18/1635* (2013.01); *C23C 18/405* (2013.01);
(Continued)

(58) Field of Classification Search
CPC ........ H01M 4/04; H01M 4/626; H01M 4/366; H01M 4/0404; H01M 4/623; C25D 7/00
See application file for complete search history.

(56) References Cited

U.S. PATENT DOCUMENTS 4,990,283 A 2/1991 Visca et al.
5,498,680 A 3/1996 Abusleme et al.
(Continued)

FOREIGN PATENT DOCUMENTS

EP 2741353 A1 6/2014

OTHER PUBLICATIONS

Alger, Mark S.M., "Polymer Science Dictionary", 1989, London School of Polymer Technology, Polytechnic of North London, UK published by Elsevier Applied Science, p. 476.

*Primary Examiner* — Stewart A Fraser

(57) ABSTRACT

The present invention pertains to an electrode-forming composition comprising: (a) at least one fluoropolymer [polymer (F)]; (b) particles of at least one active electrode material [particles (P)], said particles (P) comprising: —a core comprising at least one active electrode compound [compound (NMC)] of formula (I):

$$Li[Li_x(A_pB_QC_w)_{1-x}]O_2 \quad (I)$$

wherein A, B and C, different from each other, are selected from the group consisting of Fe, Ni, Mn and Co, x is comprised between 0 and 0.3, P is comprised between 0.2 and 0.8, preferably between 0.2 and 0.5, more preferably between 0.2 and 0.4, Q is comprised between 0.1 and 0.4, and W is comprised between 0.1 and 0.4, and —an outer layer consisting of a metal compound [compound (M)] different from Lithium, said outer layer at least partially surrounding said core; and (c) a liquid medium [medium (L)]. The present invention also pertains to a process for manufacturing said electrode-forming composition, to the (Continued)

use of said electrode-forming composition in a process for manufacturing a positive electrode and to the positive electrode obtainable therefrom.

17 Claims, 1 Drawing Sheet

(51) Int. Cl.
| | |
|---|---|
| H01M 4/505 | (2010.01) |
| H01M 4/525 | (2010.01) |
| C23C 18/18 | (2006.01) |
| H01M 4/36 | (2006.01) |
| H01M 4/62 | (2006.01) |
| C23C 18/16 | (2006.01) |
| C25D 7/00 | (2006.01) |
| C25D 5/54 | (2006.01) |
| C23C 18/40 | (2006.01) |
| H01M 4/1391 | (2010.01) |
| H01M 4/02 | (2006.01) |

(52) U.S. Cl.
CPC .................. *C25D 5/54* (2013.01); *C25D 7/00* (2013.01); *C25D 7/006* (2013.01); *H01M 4/04* (2013.01); *H01M 4/0404* (2013.01); *H01M 4/131* (2013.01); *H01M 4/366* (2013.01); *H01M 4/505* (2013.01); *H01M 4/525* (2013.01); *H01M 4/623* (2013.01); *H01M 4/626* (2013.01); *H01M 4/0409* (2013.01); *H01M 4/0414* (2013.01); *H01M 4/0419* (2013.01); *H01M 4/0452* (2013.01); *H01M 4/1391* (2013.01); *H01M 4/625* (2013.01); *H01M 2004/028* (2013.01)

(56) References Cited

U.S. PATENT DOCUMENTS

| | | |
|---|---|---|
| 6,103,843 A | 8/2000 | Abusleme et al. |
| 2002/0076486 A1 | 6/2002 | Kweon et al. |
| 2005/0153206 A1* | 7/2005 | Oesten .................. H01M 4/366 429/232 |
| 2014/0342224 A1* | 11/2014 | Cojocaru ................ H01M 4/36 429/217 |

* cited by examiner

ELECTRODE-FORMING COMPOSITION

This application is a U.S. national stage entry under 35 U.S.C. § 371 of International Application No. PCT/EP2015/080628 filed Dec. 18, 2015, which claims priority to European application No. EP 14199484.8, filed on Dec. 19, 2014. The entire contents of these applications are explicitly incorporated herein by this reference.

TECHNICAL FIELD

The present invention pertains to an electrode-forming composition, to a process for manufacturing said electrode-forming composition, to the use of said electrode-forming composition in a process for manufacturing a positive electrode and to the positive electrode obtainable therefrom.

BACKGROUND ART

Vinylidene fluoride (VDF) polymers are known in the art to be suitable as binders for the manufacture of electrodes for use in non-aqueous-type electrochemical devices such as batteries, preferably secondary batteries, and electric double layer capacitors.

Generally, techniques for manufacturing electrodes involve the use of organic solvents such as N-methyl-2-pyrrolidone (NMP) for dissolving VDF polymer binders and homogenizing them with a powdery electrode material and all other suitable components to produce a paste to be applied to a metal collector.

The role of the organic solvent is typically to dissolve the VDF polymer in order to bind the powdery electrode material particles to each together and to the metal collector upon evaporation of the organic solvent.

Nevertheless, more recently, approaches are pursued wherein use of organic solvents is commonly avoided so as to ensure more environmentally friendly techniques, and waterborne solutions have been proposed.

Nevertheless, cathode materials are generally sensitive to moisture because of solubility in water of the same and/or possibly hydrolysis phenomena leading to complete decomposition of the material, which negatively affects final electrode performances. Thus, the water-borne route for manufacturing electrodes may lead to poorer final battery performances or can even be an absolutely non practicable solution, when solubility and/or decomposition is at issue, because of the unavoidable presence of moisture introduced during manufacture of the electrode itself, which might aggress the active material at the high temperatures of typical operations.

On the other side, techniques involving the coating or plating of positive (cathode) electrode materials for improving their performances in Li batteries, including embodiments wherein the same are used for formulating cathodes including a PVDF binder, are already known in the art.

For instance, US 2002/076486 (SAMSUNG SDI CO., LTD.) 20 Jun. 2002 discloses a method for coating a positive electrode material including mixing and drying simultaneously a composition comprising a cathode active material and a coating precursor in a liquid medium. The liquid medium can be either water or an organic solvent such as an alcohol. The coating element is any of Mg, Al, Co, K, Na, Ca, Si, Ti, V, Sn, Ge, Ga, B, As, Zr, preferably Al or B. The coated materials are used for fabricating electrodes from a paste comprising PVDF in NMP.

There is thus still a shortfall in the art for electrode-forming compositions providing electrodes showing excellent performances during operation in electrochemical devices, with no negative impact due to moisture uptake of the active electrode material.

SUMMARY OF INVENTION

Figure 1:
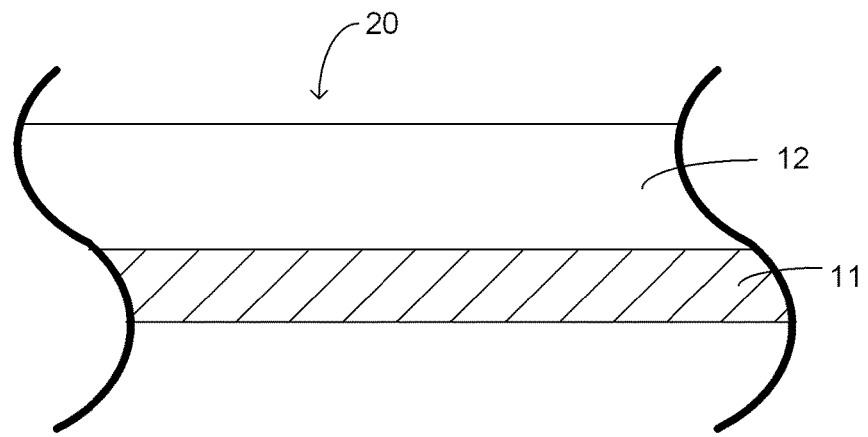
FIG. 1 shows an electrode structure obtained by applying the electrode-forming composition of the invention onto one surface of a current collector.

The Applicant has now found that it is possible to ensure excellent performances in electrochemical devices comprising electrodes manufactured from an electrode-forming composition comprising certain core-shell active electrode material particles comprising an outer layer consisting of a metal compound.

In a first instance, the present invention pertains to an electrode-forming composition comprising:
 (a) at least one fluoropolymer [polymer (F)];
 (b) particles of at least one active electrode material [particles (P)], said particles (P) comprising:
  a core comprising at least one active electrode compound [compound (NMC)] of formula (I):

$$Li[Li_x(A_P B_Q C_W)_{1-x}]_2 \qquad (I)$$

wherein A, B and C, different from each other, are selected from the group consisting of Fe, Ni, Mn and Co, x is comprised between 0 and 0.3, P is comprised between 0.2 and 0.8, preferably between 0.2 and 0.5, more preferably between 0.2 and 0.4, Q is comprised between 0.1 and 0.4, and W is comprised between 0.1 and 0.4, and
  an outer layer consisting of a metal compound [compound (M)] different from Lithium,
  said outer layer at least partially surrounding said core; and
 (c) a liquid medium [medium (L)].

The Applicant has surprisingly found that the electrode-forming composition of the present invention advantageously enables manufacturing positive electrodes surprisingly leading to electrochemical devices exhibiting capacity retention values strongly improved, even under high charge/discharge rates, over electrochemical devices comprising positive electrodes made from uncoated active electrode material particles, and even better over results obtained from core-shell active electrode material particles comprising a core of conventional active electrode material particles or from conventional electrode-forming compositions.

For the purpose of the present invention, the expression "fluoropolymer [polymer (F)]" is intended to denote any polymer comprising more than 15% by moles of recurring units derived from at least one ethylenically unsaturated monomer comprising at least one fluorine atom (hereinafter, fluorinated monomer).

The fluoropolymer comprises preferably more than 20% by moles, more preferably more than 30% by moles of recurring units derived from at least one fluorinated monomer.

The fluorinated monomer can further comprise one or more other halogen atoms, in particular chlorine. Shall the fluorinated monomer be free of hydrogen atoms, it is designated as per(halo)fluoromonomer. Shall the fluorinated monomer comprise at least one hydrogen atom, it is designated as hydrogen-containing fluorinated monomer.

The polymer (F) can be a homopolymer of one or more than one fluorinated monomers or can be a copolymer comprising recurring units derived from at least one fluorinated monomer and, optionally, from at least one hydrogenated (i.e. free of fluorine atoms) monomer.

Non-limiting examples of suitable fluorinated monomers are notably selected from the group consisting of:

$C_2$-$C_8$ fluoro- and/or perfluoroolefins such as tetrafluoroethylene (TFE), vinyl fluoride, vinylidene fluoride (VDF), trifluoroethylene (TrFE), hexafluoropropene (HFP), pentafluoropropylene and hexafluoroisobutylene;

perfluoroalkylethylenes of formula $CH_2=CH-R_{f0}$, wherein $R_{f0}$ is a $C_1$-$C_6$ perfluoroalkyl group;

chloro- and/or bromo- and/or iodo-$C_2$-$C_6$ fluoroolefins such as chlorotrifluoroethylene (CTFE);

fluoroalkylvinylethers of formula $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;

fluoro-oxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, such as perfluoro-2-propoxy-propyl group;

fluoroalkyl-methoxy-vinylethers of formula $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, such as $-C_2F_5-O-CF_3$; and fluorodioxoles of formula:

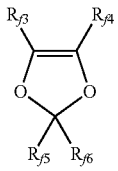

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

Non-limiting examples of suitable hydrogenated monomers are notably selected from the group consisting of ethylene, propylene, vinyl monomers such as vinyl acetate, acrylic monomers and styrene monomers, such as styrene and p-methylstyrene.

For the purpose of the present invention, the expression "at least one fluoropolymer [polymer (F)]" is intended to denote one or more than one polymers (F). Mixtures of polymers (F) can be advantageously used for the purpose of the invention.

The polymer (F) is preferably thermoplastic. The term "thermoplastic" is understood to mean, for the purpose of the present invention, a polymer existing, at room temperature, below its glass transition temperature, if it is amorphous, or below its melting point, if it is semi-crystalline, and which is linear (i.e. not reticulated). This polymer has the property of becoming soft when it is heated and of becoming rigid again when it is cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers. For the purpose of the present invention, the term "elastomer" is intended to denote a true elastomer or a polymer resin serving as a base constituent for obtaining a true elastomer. True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time. Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, the polymer (F) is semi-crystalline.

The term "semi-crystalline" is intended to denote a polymer having a heat of fusion of more than 1 J/g when measured by Differential Scanning calorimetry (DSC) at a heating rate of 10° C./min, according to ASTM D 3418.

Preferably, the polymer (F) has a heat of fusion of at least 10 J/g, more preferably of at least 30 J/g.

Generally, the polymer (F) is a hydrogen-containing fluoropolymer.

By "hydrogen-containing fluoropolymer" it is meant a fluoropolymer as defined above comprising recurring units derived from one or more than one hydrogen-containing monomers. The hydrogen-containing monomer may be a fluorinated (i.e. comprising at least one fluorine atom) monomer or may be a hydrogenated (i.e. free of fluorine atoms) monomer.

Thus, this definition encompasses notably copolymers of at least one per(halo)fluoromonomer (for instance tetrafluoroethylene, chlorotrifluoroethylene, hexafluoropropylene, perfluoroalkylvinylethers, etc.) with at least one hydrogenated monomer (for instance ethylene, propylene, vinylethers, acrylic monomers, etc.), and/or homopolymers of at least one hydrogen-containing fluorinated monomer (for instance vinylidene fluoride, trifluoroethylene, vinyl fluoride, etc.) and their copolymers with at least one fluorinated and/or hydrogenated monomer.

Preferably, the polymer (F) is a vinylidene fluoride (VDF) polymer, i.e. a polymer comprising recurring units derived from vinylidene fluoride.

The VDF polymer [polymer (VDF)] is generally a semi-crystalline VDF polymer which can be advantageously processed in molten phase and which possesses typically a heat of fusion of more than 5 J/g, preferably more than 7 J/g, even more preferably 10 J/g, when measured according to ASTM D 3418.

The polymer (VDF) is preferably a polymer comprising:

(aa) at least 50% by moles, preferably at least 70% by moles, more preferably at least 80% by moles of recurring units derived from vinylidene fluoride (VDF);

(bb) optionally, from 0.1% to 20% by moles, preferably from 0.1% to 15% by moles, more preferably from 0.1% to 10% by moles of a fluorinated monomer different from VDF, said fluorinated monomer being preferably selected from the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and (cc) optionally, from 0.1% to 10%, by moles, preferably from 0.1% to 5% by moles, more preferably from 0.1% to 3% by moles, based on the total amount of monomers (aa) and (bb), of at least one hydrogenated monomer.

According to certain preferred embodiments of the invention, the polymer (F) is a polymer VDF comprising recurring units derived from vinylidene fluoride (VDF) and from at least one (meth)acrylic monomer (MA) of formula (II):

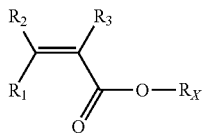
(II)

wherein:
- $R_1$, $R_2$ and $R_3$, equal to or different from each other, are independently selected from a hydrogen atom and a $C_1$-$C_3$ hydrocarbon group, and
- $R_X$ is a hydrogen atom or a $C_1$-$C_5$ hydrocarbon moiety comprising at least one hydroxyl group.

The polymer (VDF) according to this preferred embodiment of the invention comprises typically at least 50% by moles, preferably at least 70% by moles, more preferably at least 80% by moles of recurring units derived from vinylidene fluoride (VDF).

The polymer (F) comprises typically at least 0.01% by moles, preferably at least 0.02% by moles, more preferably at least 0.03% by moles of recurring units derived from at least one (meth)acrylic monomer (MA) of formula (II) as defined above.

The polymer (F) comprises typically at most 10% by moles, preferably at most 5% by moles, more preferably at most 2% by moles of recurring units derived from at least one (meth)acrylic monomer (MA) of formula (II) as defined above.

The (meth)acrylic monomer (MA) of the polymer (VDF) is preferably of formula (II-A):

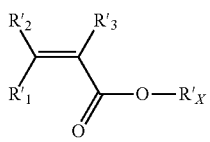
(II-A)

wherein:
- $R'_1$, $R'_2$ and $R'_3$ are hydrogen atoms, and
- $R'_X$ is a hydrogen atom or a $C_1$-$C_5$ hydrocarbon moiety comprising at least one hydroxyl group.

Non-limiting examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the group consisting of:
hydroxyethyl acrylate (HEA) of formula:

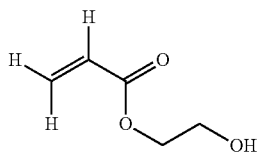

2-hydroxypropyl acrylate (HPA) of either of formulae:

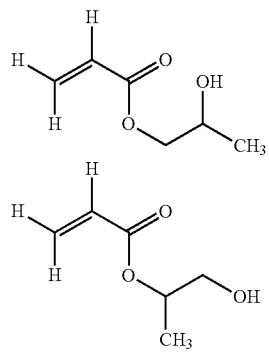

acrylic acid (AA) of formula:

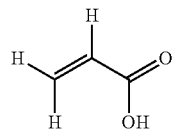

and mixtures thereof.

Good results have been obtained when the (meth)acrylic monomer (MA) of the polymer (VDF) is acrylic acid (AA) or hydroxyethyl acrylate (HEA).

The polymer (VDF) may further comprise recurring units derived from at least one other fluorinated monomer different from VDF, said fluorinated monomer being preferably selected from the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

Should the polymer (VDF) comprise recurring units derived from at least one fluorinated monomer different from VDF, the polymer (VDF) typically comprises from 0.1% to 20% by moles, preferably from 0.1% to 15% by moles, more preferably from 0.1% to 10% by moles of recurring units derived from said monomer(s).

The polymer (F) used in the present invention is generally prepared by polymerization processes known in the art, using aqueous free-radical emulsion polymerization, although suspension, solution and supercritical $CO_2$ polymerization processes may notably also be used.

The aqueous free-radical emulsion polymerization is typically carried out in the presence of at least one initiator, at least one non-functional perfluoropolyether (PFPE) oil, and, optionally, at least one surfactant [surfactant (S)].

The aqueous free-radical emulsion polymerization is typically carried out at a pressure comprised between 20 bar and 70 bar, preferably between 25 bar and 65 bar. The skilled in the art will choose the polymerization temperature having regard, inter alia, of the initiator used.

The aqueous free-radical emulsion polymerization temperature is typically carried out at a temperature comprised between 60° C. and 135° C., preferably between 90° C. and 130° C.

While the choice of the initiator is not particularly limited, it is understood that water-soluble initiators suitable for aqueous free-radical emulsion polymerization processes are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hyperoxide; pinane hydroperoxide; cumene hydroperoxide; and tert-butyl hydroperoxide.

Other suitable initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)—[CF(CF_3)CF_2O]_m—CF(CF_3)—COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^α N=N R^α$, where $R^α$ is a linear or branched perfluorocarbon group having 1-8 carbons; stable or hindered perfluoroalkane radicals such as hexafluoropropylene trimer radical, $[(CF_3)_2CF]_2(CF_2CF_2)C^●$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as initiators to initiate the polymerization process.

By "non-functional perfluoropolyether (PFPE) oil" it is hereby intended to denote a perfluoropolyether (PFPE) oil comprising a (per)fluoropolyoxyalkylene chain [chain $(R_f)$] and non-functional end-groups.

The non-functional end groups of the PFPE oil are generally selected from fluoro(halo)alkyl groups having 1 to 3 carbon atoms, optionally comprising one or more halogen atoms different from fluorine or hydrogen atoms, e.g. $CF_3—$, $C_2F_5—$, $C_3F_6—$, $ClCF_2CF(CF_3)—$, $CF_3CFClCF_2—$, $ClCF_2CF_2—$, $ClCF_2—$.

The non-functional PFPE oil has a number average molecular weight advantageously comprised between 400 and 3000, preferably between 600 and 1500.

The non-functional PFPE oil is preferably selected from the group consisting of:

(1) non-functional PFPE oils commercially available from Solvay Specialty Polymers Italy S.p.A. under the trademark names GALDEN® and FOMBLIN®, said PFPE oils generally comprising at least one PFPE oil complying with either of formulae here below:

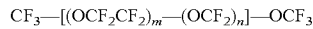

m+n=40-180; m/n=0.5-2

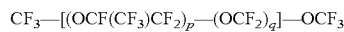

p+q=8-45; p/q=20-1000

(2) non-functional PFPE oils commercially available from Daikin under the trademark name DEMNUM®, said PFPEs generally comprising at least one PFPE complying with formula here below:

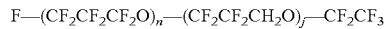

j=0 or integer>0; n+j=10-150

(3) non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

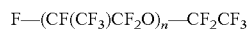

n=10-60

The non-functional PFPE oil is more preferably selected from those having formula (1) as defined above.

The aqueous free-radical emulsion polymerization as detailed above is typically carried out in the presence of a chain transfer agent.

The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro (fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms, like, e.g., bis(ethyl)carbonate, bis(isobutyl)carbonate. The chain transfer agent may be fed to the aqueous medium at the beginning, continuously or in discrete amounts (step-wise) during the polymerization, continuous or stepwise feeding being preferred.

Aqueous free-radical emulsion polymerization processes as detailed above have been described in the art (see e.g. U.S. Pat. No. 4,990,283 (AUSIMONT S.P.A.) 5 Feb. 1991, U.S. Pat. No. 5,498,680 (AUSIMONT S.P.A.) 12 Mar. 1996 and U.S. Pat. No. 6,103,843 (AUSIMONT S.P.A.) 15 Aug. 2000.

The surfactant (S), if any, may be either a fluorinated surfactant [surfactant (FS)] or a hydrogenated surfactant free from fluorine atoms [surfactant (H)].

The surfactant (FS) is typically of formula (III):

wherein:

$R_{fS}$ is selected from a $C_4$-$C_{16}$ (per)fluoroalkyl chain, optionally comprising one or more catenary or non-catenary oxygen atoms, and a (per)fluoropolyoxyalkyl chain, $X^-$ is selected from $—COO^-$, $—PO_3^-$ and $—SO_3^-$, $M^+$ is selected from $NH_4^+$ and an alkaline metal ion, and k is 1 or 2.

Non-limiting examples of surfactants (FS) suitable for use in aqueous free-radical emulsion polymerization processes include, notably, the followings:

(1') $CF_3(CF_2)_{n0}COOM'$, wherein $n_0$ is an integer ranging from 4 to 10, preferably from 5 to 7, preferably $n_0$ being equal to 6, and M' represents $NH_4$, Na, Li or K, preferably $NH_4$;

(2') $T-(C_3F_6O)_{n1}(CFYO)_{m1}CF_2COOM"$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is 0 or an integer ranging from 1 to 6, M" represents $NH_4$, Na, Li or K and Y represents F or $—CF_3$;

(3') F—(CF$_2$CF$_2$)$_{n2}$—CH$_2$—CH$_2$—X*O$_3$M''', wherein X* is a phosphorus or a sulphur atom, preferably X* being a sulphur atom, M'' represents NH$_4$, Na, Li or K and n$_2$ is an integer ranging from 2 to 5, preferably n$_2$ being equal to 3;

(4') [R$_f$—O-L-COO$^-$]$_i$X$^{i+}$, wherein L represents a linear partially or fully fluorinated alkylene group or an aliphatic hydrocarbon group, R$_f$ represents a linear partially or fully fluorinated aliphatic group or a linear partially or fully fluorinated aliphatic group interrupted with one or more oxygen atoms, X$^{i+}$ represents a cation having the valence i and i is 1, 2 or 3;

(5') A-R$_{bf}$—B bifunctional fluorinated surfactants, wherein A and B, equal to or different from each other, have formula —(O)$_p$CFY''-COOM*, wherein M* represents NH$_4$, Na, Li or K, preferably M* representing NH$_4$, Y'' is F or —CF$_3$ and p is 0 or 1, and R$_{bf}$ is a divalent (per) fluoroalkyl chain or (per)fluoropolyether chain such that the number average molecular weight of A-R$_{bf}$—B is in the range of from 300 to 1800; and (6') mixtures thereof.

Non-limiting examples of surfactants (H) suitable for use in aqueous free-radical emulsion polymerization processes include, notably, ionic and non-ionic hydrogenated surfactants such as 3-allyloxy-2-hydroxy-1-propane sulfonic acid salts, polyvinylphosphonic acid, polyacrylic acids, polyvinyl sulfonic acid, and salts thereof, octylphenol ethoxylates, polyethylene glycol and/or polypropylene glycol and the block copolymers thereof, alkyl phosphonates and siloxane-based surfactants.

The surfactant (H) is preferably added to the aqueous latex are non-ionic surfactants commercially available as TRITON® X series and PLURONIC® series.

The aqueous free-radical emulsion polymerization generally results in an aqueous latex comprising at least one polymer (F) generally having a solid content of from 10% to 60% by weight, preferably of from 10% to 50% by weight, and having an average particle size of less than 500 nm, preferably of less than 400 nm, and more preferably of less than 300 nm. The average particle size is generally at least 20 nm, preferably at least 50 nm.

The aqueous latex comprising at least one polymer (F) can be used as such for manufacturing the electrode-forming composition of the invention or said at least one polymer (F) can be coagulated, separated from the aqueous polymerization medium and provided under the form of particles for being incorporated in the electrode-forming composition of the invention.

The electrode-forming composition of the invention generally comprises at least one polymer (F) in an amount of from 0.5% to 10% by weight, preferably of from 1% to 8% by weight, based on the total weight of the electrode-forming composition.

The electrode-forming composition of the invention may further comprise at least one surfactant (S). The surfactant (S) is generally added in order to improve shelf-stability and to provide additional stabilization of the polymer (F), in particular in the process for manufacturing the electrode-forming composition of the invention.

The surfactant (S), if any, is typically present in the electrode-forming composition of the invention, as a whole or in part, in combination with at least one polymer (F), as a result of the aqueous free-radical emulsion polymerization process, and/or may be added, as a whole or in part, to said electrode-forming composition after polymerization.

The surfactant (FS), if any, is generally provided in combination with at least one polymer (F), generally in the form of an aqueous latex of at least one polymer (F) comprising said surfactant (FS) as a result of the aqueous free-radical emulsion polymerization process. Nevertheless, embodiments wherein at least a fraction of a surfactant (FS) is added separately during manufacture of the electrode-forming composition of the invention are also to be considered.

The surfactant (H), if any, is generally added during manufacture of the electrode-forming composition separately from the polymer (F).

The surfactant (S), if any, is generally present in an amount of from 0.01% to 10% by weight, preferably of from 0.05% to 5% by weight, more preferably of from 0.1% to 3% by weight, based on the total weight of the electrode-forming composition.

For the purpose of the present invention, by "active electrode material" it is intended to denote an electroactive particulate material which actively participates in the redox reaction during charge/discharge cycles of an electrochemical device.

It is thus understood that the compound (NMC) of formula (I) as defined above is different from the compound (M) of the outer layer of the particles (P), which is substantially inert in the redox reaction.

The compound (NMC) is preferably of formula (I-A):

$$\text{Li}[\text{Li}_{x'}(\text{Ni}_{P'}\text{Mn}_{Q'}\text{Co}_{W'})_{1-x'}]\text{O}_2 \qquad (\text{I-A})$$

wherein x' is comprised between 0 and 0.3, P' is comprised between 0.2 and 0.8, preferably between 0.2 and 0.5, more preferably between 0.2 and 0.4, Q' is comprised between 0.1 and 0.4, and W' is comprised between 0.1 and 0.4.

The compound (NMC) is more preferably of formula (I-B):

$$\text{Li}[\text{Li}_{x''}(\text{Ni}_{P''}\text{Mn}_{Q''}\text{Co}_{W''})_{1-x''}]\text{O}_2 \qquad (\text{I-B})$$

wherein x'' is equal to 0, P'' is comprised between 0.2 and 0.8, preferably between 0.2 and 0.5, more preferably between 0.2 and 0.4, Q'' is comprised between 0.1 and 0.4, and W'' is comprised between 0.1 and 0.4, with the proviso that the sum (P''+Q''+W'') is equal to 1.

Non-limiting examples of suitable compounds (NMC) of formula (I-A) include, notably, the followings: Li(Ni$_{1/3}$Mn$_{1/3}$Co$_{1/3}$)O$_2$, Li$_{1.12}$(Ni$_{0.5}$Mn$_{0.3}$Co$_{0.2}$)$_{0.88}$O$_2$, Li$_{1.12}$(Ni$_{0.13}$Mn$_{0.54}$Co$_{0.13}$)O$_2$ and Li(Ni$_{0.4}$Mn$_{0.4}$CO$_{0.2}$)O$_2$.

According to an embodiment of the invention, the compound (NMC) of formula (I) as defined above may be at least partially surrounded by a layer consisting of a metal oxide of formula (IV):

$$\text{Li}_y\text{Mn}_q\text{O}_z \qquad (\text{IV})$$

wherein y is comprised between 1 and 3, preferably between 1.5 and 2.5, q is comprised between 1 and 2, and z is comprised between 2 and 4.

Non-limiting examples of suitable metal oxides of formula (IV) include, notably, Li$_2$MnO$_3$.

Should the compound (NMC) of formula (I) as defined above be at least partially surrounded by a layer consisting of a metal oxide of formula (IV) as defined above, said metal oxide of formula (IV) is typically present in an amount comprised between 30% and 70% by moles, based on the total moles of said compound (NMC) of formula (I) and said metal oxide of formula (IV).

The outer layer of the particles (P) preferably completely surrounds (e.g., encapsulating) the core. Still, it is possible for the particles (P) to comprise an outer layer not completely surrounding the core, but only partially covering the core, leaving a portion of the core exposed. These particles will typically be present in relatively small amounts, typically less than 10% by weight compared to particles where the outer layer does completely surround or encapsulate the core.

The compound (M) typically comprises, preferably consists of, one or more metals.

The compound (M) is typically different from Lithium. The expression "metal compound [compound (M)] different from Lithium" is intended to encompass both a single metal different from Lithium in its elemental oxidation state but also intermetallic compounds comprising more than one metal in their elemental oxidation state (including metal alloys), wherein at least one of said metals is different from Lithium.

The compound (M) preferably comprises, more preferably consists of, one or more metals selected from the group consisting of Ru, Ti, Cd, TI, Pb, In, Al, Ti, Cu, Ni, Pd, V, Fe, Cr, Mn, Co, Mo, W, Ag, Au, Pt, Ir, Ru, Pd, Sn and Ga. The compound (M) is advantageously one of Ru, Ti, Cd, TI, Pb, In, Al, Ti, Cu, Ni, Pd, V, Fe, Cr, Mn, Co, Mo, W, Ag, Au, Pt, Ir, Ru, Pd, Sn and Ga or it is an alloy of one or more of Ru, Ti, Cd, TI, Pb, In, Al, Ti, Cu, Ni, Pd, V, Fe, Cr, Mn, Co, Mo, W, Ag, Au, Pt, Ir, Ru, Pd, Sn and Ga. The compound (M) more preferably comprises, even more preferably consists of, one or more metals selected from the group consisting of Ni, Cu, Al, Ag and alloys thereof. The compound (M) even more preferably comprises, still more preferably consists of, one or more metals selected from the group consisting of Ni, Cu and alloys thereof.

According to a first embodiment of the invention, the particles (P) are typically obtainable by evaporation techniques such as chemical vapour deposition, thermal evaporation, ion beam evaporation, filament evaporation, vacuum deposition and sputtering techniques.

According to a second embodiment of the invention, the particles (P) are typically obtainable by a process comprising contacting at least one compound (NMC) of formula (I) as defined above with a liquid phase, including coating, impregnation or dipping techniques.

Among those techniques, electroplating and electroless plating are particularly suitable for manufacturing the particles (P) as defined above. Very good results have been obtained using electroless plating.

Electroplating is typically carried out in an electrolytic cell, usually comprising a solution of an ionic precursor of a compound (M) in a suitable liquid medium, an anode which may consist of the metal being plated (a soluble anode) or an insoluble anode (usually carbon, platinum, titanium, lead, or steel), and a cathode.

Electroless plating, also known as chemical or autocatalytic plating, is typically carried out in an electrochemical cell, usually comprising a plating bath, said plating bath typically comprises an ionic precursor of a compound (M) in a suitable liquid medium, in which the particles of the compounds (NMC) of formula (I) as defined above are introduced, in the additional presence of a suitable agent inducing plating of the compound (M) onto said particles.

Generally, ionic salts of the compound (M) comprising the metal in an oxidative state higher than zero are used in combination with appropriated chemical reducing agents suitable for reducing said ionic salts of the compound (M) into a compound (M) in its elemental state.

The electroless plating bath may comprise either an aqueous medium or a non-aqueous medium.

The electroless plating bath typically further comprises a catalyst, said catalyst being typically selected from the group consisting of catalysts based on palladium, platinum, rhodium, iridium, nickel, copper, silver and gold.

To the aim of electroless plating an outer layer consisting of Cu, generally, a plating bath comprising sodium hydroxide, formaldehyde, a chelating agent (e.g. EDTA) and a copper salt (generally a $Cu^{2+}$ salt, such as CuSO 4) is used. Palladium-based catalysts are often preliminarily impregnated onto the particles of the compound (NMC) of formula (I) as defined above. Without being bound by this theory, it is generally understood that, during electroless plating, possibly catalyzed by palladium-based catalysts, formaldehyde reduces copper ions into metallic copper.

The electrode-forming composition of the invention typically comprises the particles (P) in an amount of from 80% to 98% by weight, preferably of from 85% to 97% by weight, more preferably of from 87% to 96% by weight, based on the total weight of the electrode-forming composition.

For the purpose of the present invention, the term "liquid medium" is intended to denote a medium comprising one or more substances in the liquid state at 20° C. under atmospheric pressure.

The electrode-forming composition of the invention typically comprise a medium (L) in an amount of from 25% to 70% by weight, preferably of from 30% to 60% by weight, more preferably of from 32% to 60% by weight, based on the total weight of the electrode-forming composition.

According to a first embodiment of the invention, the medium (L) typically comprises, preferably consists of, water.

According to this first embodiment of the invention, the polymer (F) is typically provided in the form of an aqueous latex as defined above.

According to a second embodiment of the invention, the medium (L) typically comprises, preferably consists of, at least one organic solvent [solvent (S)].

According to this second embodiment of the invention, the polymer (F) is typically provided in the form of a dry powder.

The solvent (S) is typically selected from the group consisting of polar organic solvent such as N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate.

The electrode-forming composition of the invention may further comprise one or more other ingredients.

The electrode-forming composition of the invention typically further comprises at least one electroconductivity-imparting additive. Should the electrode-forming composition of the invention comprise at least one electroconductivity-imparting additive, said additive is typically present in an amount of from 0.5% to 15% by weight, preferably of from 0.75% to 12.5% by weight, more preferably of from 1% to 10% by weight, based on the total weight of the electrode-forming composition, advantageously aiming at improving the conductivity of the electrode.

Non-limiting examples of suitable electroconductivity-imparting additives include, notably, carbon black, graphene or carbon nanotubes and powders and fibers of metals, such as nickel and aluminum.

The electrode-forming composition of the invention may also further comprise at least one thickener; when present, the amount of said at least one thickener (also designated as rheology modifier) is not particularly limited and generally ranges between 0.1% and 10% by weight, preferably between 0.5% and 5% by weight, based on the total weight of the electrode-forming composition. The thickener is generally added in order to prevent or slow down the settling of the active electrode material from the electrode-forming composition of the invention, while providing appropriate viscosity of the composition for a casting process. Non-limiting examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

In a second instance, the present invention pertains to a process for manufacturing the electrode-forming composition of the invention.

The process advantageously comprises mixing at least one polymer (F), the particles (P) and, optionally, one or more other ingredients in a medium (L).

In the process of the invention, the polymer (F) can be provided under the form of a dry powder or can be provided under the form of a liquid composition. The liquid composition may be an aqueous latex comprising at least one polymer (F) as directly obtained from an aqueous free-radical emulsion polymerization process or may be a liquid composition obtainable by dispersing a dry powder of at least one polymer (F) in a medium (L).

Mixing of at least one polymer (F), particles (P) and, optionally, one or more other ingredients in a medium (L) of the electrode-forming composition as defined above may be carried out by means of an apparatus such as a roll kneader, a mixer, a homo mixer, a ball mixer, or a bead mill.

In a third instance, the present invention pertains to a process for manufacturing a positive electrode, said process comprising using the electrode-forming composition as defined above.

The process for manufacturing a positive electrode advantageously comprises:

(i) applying the electrode-forming composition as defined above onto at least one surface of a current collector thereby providing a film; and (ii) drying the film provided in step (i).

For the purpose of the present invention, the term "current collector" is intended to denote an electrically conducting substrate allowing electrons to flow during either charge cycles or discharge cycles.

The current collector typically comprises a metal layer, preferably comprises a metal layer consisting of a metal selected from the group consisting of iron, stainless steel, steel, copper, aluminium, nickel and titanium.

The metal layer of the current collector is typically in the form of either a metal foil or a metal grid.

The electrode-forming composition may be applied by any conventional wet coating process. Particularly, as non-limiting examples, the wet coating process may include screen printing, coating using a roll coater, a blade coater, a slit coater, a curtain coater, a wire coater, a sprayer, a foam applicator and a brush coater.

Drying is typically carried out either under atmospheric pressure or under vacuum. Alternatively, drying can be performed under modified atmosphere, e.g. under an inert gas, typically exempt notably from moisture (water vapour content of less than 0.001% v/v). The drying temperature will be selected so as to effect removal by evaporation of the medium (L) from the positive electrode of the invention.

Drying is preferably carried out under atmospheric pressure.

The film provided in step (i) of the process of the invention is dried typically at a temperature comprised between 25° C. and 200° C., preferably between 50° C. and 200° C.

Thus, in a fourth instance, the present invention pertains to the positive electrode obtainable by the process of the invention.

In a fifth instance, the present invention pertains to an electrochemical device comprising the positive electrode of the invention. Non-limiting examples of suitable electrochemical devices include notably batteries such as secondary batteries, preferably Lithium ion batteries, and capacitors, such as electric double layer capacitors.

For the purpose of the present invention, the term "secondary" is intended to denote a rechargeable battery which needs an external electrical source to recharge it. A battery typically undergoes an electrochemical process in an electrochemical cell wherein electrons flow from a negative electrode to a positive electrode during either charge cycles or discharge cycles.

For the purpose of the present invention, the term "negative electrode" is intended to denote the anode of an electrochemical cell where oxidation takes place.

For the purpose of the present invention, the term "positive electrode" is intended to denote the cathode of an electrochemical cell where reduction takes place.

The electrode-forming composition of the invention may be used for manufacturing a positive electrode having partial sectional structure as shown in FIG. 1. More specifically, the electrode-forming composition of the invention may be applied onto one surface (FIG. 1) of a current collector (11) comprising, preferably consisting of, a foil or a wire net consisting of a metal, such as iron, stainless steel, steel, copper, aluminum, nickel or titanium, and having a thickness of, e.g., 5-100 µm, or 5-20 µm for a small-sized device, and dried to form a composite electrode layer (12) of, e.g., 10-1000 µm in thickness for a small-sized device, thereby providing an electrode structure (20).

Alternatively, it is also possible to provide a positive electrode similar to the one shown in FIG. 1 by once forming a composite electrode layer (12) as shown in FIG. 1 onto a current collector (11) or an arbitrary substrate having a better releasability by application and drying, then peeling only the composite electrode layer (12) apart from the substrate to obtain an electrode sheet, and then applying the electrode sheet onto a current collector (11) with an electroconductive adhesive by a manufacturer of an electrochemical device.

Figure 2:
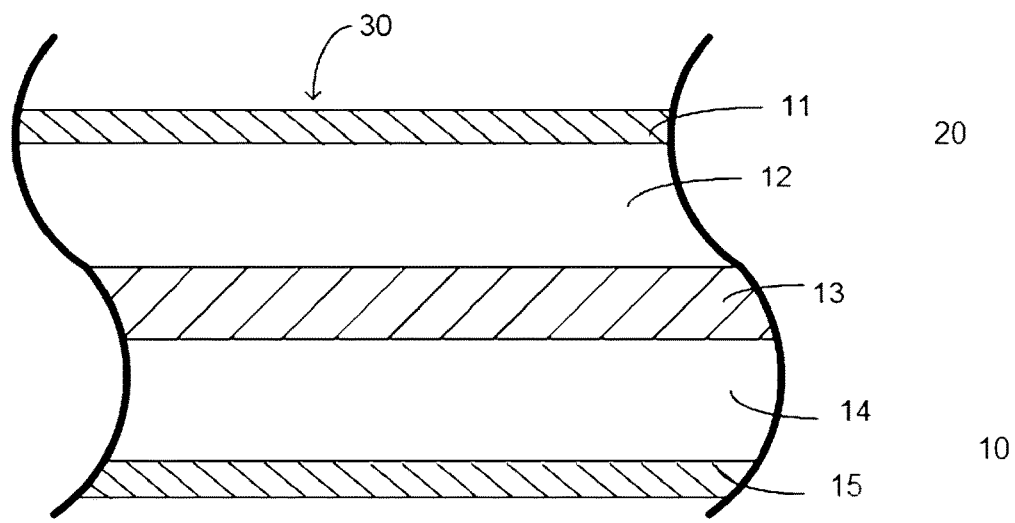
FIG. 2 is a laminate structure obtained by assembling a pair of electrode structures with a separator.

The thus-formed positive electrode (20) may preferably be used as a positive electrode for an electrochemical device wherein it is used in the state of being dipped in a non-aqueous electrolytic solution. For example, a laminate structure (30) as shown in FIG. 2 may be formed by disposing a positive electrode (20) as shown in FIG. 1 and a negative electrode (10) so that their composite electrode layers (12) and (14) are disposed on inner sides and opposite to each other, disposing a liquid permeable separator (13) so as to be sandwiched between the composite electrode layers (12) and (14), and impregnating the composite electrode layers (12) and (14) and the separator (13) with a non-aqueous electrolytic solution. Such a laminate structure (30) as shown in FIG. 2 may constitute a battery such as a secondary battery or an electric double layer capacitor.

The positive electrode according to the present invention, preferably in the form of an electrode structure (20) (FIG. 1), is particularly suitable for use in a secondary battery, preferably in a Lithium ion battery.

Should the disclosure of any patents, patent applications, and publications which are incorporated herein by reference conflict with the description of the present application to the extent that it may render a term unclear, the present description shall take precedence.

The invention will be now described in more details with respect to the following examples, whose purpose is merely illustrative and not intended to limit the scope of the invention.

Raw Materials $Li(Ni_{1/3}Mn_{1/3}CO_{1/3})O_2$ commercial powder grade supplied by Umicore N.V [compound (NMC-1)].

PREPARATIVE EXAMPLE 1

Manufacture Of An Aqueous Vdf-Aa Polymer Latex

In a 21 lt. horizontal reactor autoclave equipped with baffles and stirrer working at 40 rpm, 14 lt. of deionised water were introduced, followed by 0.1 g of a 20% by weight aqueous solution of FLUOROLINK® 7800 SW sodium salt fluorinated surfactant. The pressure of 35 bar was maintained constant throughout the whole trial by feeding VDF gaseous monomer. Then the temperature was brought to 85° C. and 400 ml of a 37.5 g/l aqueous solution of ammonium persulfate (APS) were added over a period of 20 minutes. For the whole duration of the trial, 20 ml of a solution of acrylic acid (AA) (2.3% w/w acrylic acid in water) were fed every 250 g of polymer synthesized.

When 5000 g of the mixture were fed, the feeding mixture was interrupted, then the pressure was let to fall down up to 11 bar while keeping the reaction temperature constant. Final reaction time was 150 min.

The reactor was cooled to room temperature, the latex was unloaded and 1000 g of a 10% by weight aqueous solution of PLURONIC® F108 hydrogenated surfactant were added upon stirring.

The VDF-AA polymer so obtained contained 0.15% by moles of acrylic acid (AA) monomer.

The aqueous latex so obtained had a solid content of 26% by weight.

The VDF-AA polymer is dispersed in the aqueous latex under the form of particles having an average primary size of 340 nm, as measured according to ISO 13321.

PREPARATIVE EXAMPLE 2

Manufacture Of A Liquid Composition Of A Pvdf Polymer

A 8% by weight solution of PVDF was prepared by mixing 4 g of a PVDF powder and 46 g of N-methyl-2-pyrrolidone (NMP) under stirring until complete polymer dissolution.

PREPARATIVE EXAMPLE 3

Metallization Process

Particles of the compound (NMC-1) were coated with Ni by electroless plating. Prior to Ni deposition, a Pd activation process was carried out by immersion of the compound (NMC-1) in an aqueous solution containing 0.03 g/L of $PdCl_2$ for one minute, resulting in the particles of the compound (NMC-1) being entirely covered with Pd particles at a high density. The so activated particles of the compound (NMC-1) were then immersed under magnetic stirring (200 rpm) in an aqueous plating electrolyte containing $NiCl_2$. The plating temperature was 40° C. and the pH value of the plating solution was 9.5. After deposition of Ni, the Ni-coated particles of the compound (NMC-1) were dried in an oven at 200° C. for one hour.

EXAMPLE 1

Manufacture Of A Positive Electrode Using The Ni-coated Particles Of The Compound (NMC-1) Of Preparative Example 3

An aqueous composition was prepared by mixing 6.8 g of the aqueous VDF-AA polymer latex prepared according to Preparative Example 1, 0.4667 g of carboxylated methyl cellulose as thickener, 2.13 g of deionised water, 0.7 g of SUPER P® conductive carbon black and 32.55 g of Ni-coated particles of the compound (NMC-1) prepared according to Preparative Example 3.

The mixture was homogenised by moderate stirring using a Dispermat equipped with a flat PTFE disc.

A positive electrode was obtained by casting the aqueous composition so obtained onto an aluminium foil with a doctor blade and then drying the coating layer so obtained in an oven with three temperature steps at 60° C. for 30 minutes, then at 110° C. for 30 minutes and finally at 200° C. for 60 minutes. The thickness of the dried coating layer was about 60-70 μm. The positive electrode so obtained was composed by 4% by weight of the VDF-AA polymer binder, 93% by weight of the active material, 2% by weight of the conductive additive and 1% by weight of the thickener.

EXAMPLE 2

Manufacture of a Positive Electrode the Ni-coated Particles of the Compound (NMC-1) of Preparative Example 3

The same procedure as detailed under Example 1 was followed but using a slurry prepared by mixing 11.25 g of the liquid composition of a PVDF polymer prepared according to Preparative Example 2, 11.7 g of NMP, 0.68 g of SUPER C65® conductive carbon black and 21.38 g of Ni-coated particles of the compound (NMC-1) prepared according to Preparative Example 3. All the materials involved in the slurry preparation were previously conditioned either by drying using molecular sieve of 4 Å (for the solvent) or by heating for one night at 100° C. (for the powders). A positive electrode was obtained by casting the slurry so obtained onto an aluminium foil with a doctor blade and then drying the coating layer so obtained in an oven with two temperature steps at 80° C. for 30 minutes, then at 130° C. for 30 minutes. The thickness of the dried coating layer was about 60-70 μm. The positive electrode so obtained was composed by 2% by weight of the PVDF polymer binder, 95% by weight of the active material and 3% by weight of the conductive additive.

COMPARATIVE EXAMPLE 1

Manufacture of a Positive Electrode Using Uncoated Particles of the Compound (NMC-1)

A positive electrode was prepared following the same procedure as detailed under Example 1 but using uncoated particles of the compound (NMC-1).

COMPARATIVE EXAMPLE 2

Manufacture of a Positive Electrode Using Uncoated Particles of the Compound (NMC-1)

A positive electrode was prepared following the same procedure as detailed under Example 2 but using uncoated particles of the compound (NMC-1).

COMPARATIVE EXAMPLE 3

Manufacture of a Positive Electrode Using Uncoated $LiCoO_2$ Particles

A slurry was prepared by mixing 12.5 g of the liquid composition of a PVDF polymer prepared according to Preparative Example 2, 18.5 g of NMP, 1.0 g of SUPER C65® conductive carbon black and 18 g of bare $LiCoO_2$ particles. All the materials involved in the slurry preparation were previously conditioned either by drying using molecular sieve of 4 Å (for the solvent) or by heating for one night at 100° C. (for the powders).

The mixture was homogenised by moderate stirring using a Dispermat equipped with a flat PTFE disc.

A positive electrode was obtained by casting the slurry so obtained onto an aluminium foil with a doctor blade and then drying the so obtained coating layer in an oven at 130° C. for 30 minutes under vacuum. The thickness of the dried coating layer was about 50-60 μm. The positive electrode so obtained was composed by 5% by weight of the PVDF polymer binder, 90% by weight of the active material and 5% by weight of the conductive additive.

COMPARATIVE EXAMPLE 4

Manufacture of a Positive Electrode Using Uncoated $LiCoO_2$ Particles

The same procedure as detailed under Example 1 was followed but using an aqueous composition prepared by mixing 4.15 g of the aqueous VDF-AA polymer latex prepared according to Preparative Example 1, 0.12 g of carboxylated methyl cellulose as thickener, 12.9 g of deionised water, 0.7 g of SUPER C65® conductive carbon black and 21.6 g of bare $LiCoO_2$ particles.

The thickness of the dried coating layer was about 50-60 μm. The positive electrode so obtained was composed by 4.5% by weight of the VDF-AA polymer binder, 90% by weight of the active material, 5% by weight of the conductive additive and 0.5% by weight of the thickener.

COMPARATIVE EXAMPLE 5

Manufacture of a Positive Electrode Using Cu-coated $LiCoO_2$ Particles

A cathode was prepared following the same procedure as detailed under Comparative Example 4 but using particles of $LiCoO_2$ powders coated with Cu by electroless plating. Prior to Cu deposition, a Pd activation process was carried out by immersion of the $LiCoO_2$ particles in an aqueous solution containing 0.03 g/L of $PdCl_2$ for one minute, resulting in the $LiCoO_2$ particles being entirely covered with Pd particles at a high density. The so activated $LiCoO_2$ particles were then immersed under magnetic stirring (200 rpm) in an aqueous plating bath containing 6 g/L of copper sulfate, 27 g/L of EDTA, 7.47 mL/L of formaldehyde and 5.6 g/L of sodium hydroxide. The plating temperature was 60° C. and the pH value of the plating solution was 12. After deposition of Cu, the Cu-coated $LiCoO_2$ particles were dried in an oven at 100° C. for 2 hours.

COMPARATIVE EXAMPLE 6

Manufacture of a Positive Electrode Using ZnO-coated Particles of the Compound (NMC-1)

A cathode was prepared following the same procedure as detailed under Example 1 but using particles of the compound (NMC-1) coated with ZnO by electroless plating. Prior to ZnO deposition, a Pd activation process was carried out by immersion of the compound (NMC-1) in an aqueous solution containing 0.03 g/L of $PdCl_2$ for one minute, resulting in the particles of the compound (NMC-1) being entirely covered with Pd particles at a high density.

The so activated particles of the compound (NMC-1) were then immersed under magnetic stirring (200 rpm) in an aqueous plating bath containing g 0.05 M zinc nitrate and 0.05 M dimethylaminoborane. The plating temperature was 60° C. and the pH value of the plating solution was 6.5. After deposition of ZnO, the ZnO-coated particles of the compound (NMC-1) were dried in an oven at 200° C. for 2 hours.

Evaluation of Electrochemical Properties of Manufactured Cathodes

Lithium coin cells (CR2032 type) were prepared in a glove box under Ar gas atmosphere by punching a small disk of the positive electrode prepared according to Example 1 or Example 2 or any of Comparative Examples 1 to 6 with Lithium metal as counter and reference electrode. The electrolyte was 1 M $LiPF_6$ in ethylene carbonate (EC)/dimethylcarbonate (DMC) (1:1 vol/vol) and a WHATMAN® glass-fiber paper was used as separator.

After initial charge and discharge cycles at low current rate, cells were galvanostatically cycled at constant current rate of 5 C to show capacity fade over cycling (see Table 1 here below). The electrochemical results confirm that the particles (P) advantageously enable manufacturing positive electrodes surprisingly leading to secondary batteries exhibiting capacity retention values strongly improved, even under high charge/discharge rates, over secondary batteries comprising positive electrodes made from uncoated active electrode material particles, and even better over results obtained from core-shell active electrode material particles comprising a core of conventional active electrode material particles or from conventional electrode-forming compositions.

TABLE 1

| Run | RC (D/20, 1st cycle) [mAh/g] | RC (5D, 11th cycle) [mAh/g] | Capacity retention [%] |
|---|---|---|---|
| Ex. 1 | 156.7 | 137.8 | 88% |
| C. Ex. 1 | 157.9 | 91.0 | 57% |
| Ex. 2 | 156.4 | 144.4 | 92% |
| C. Ex. 2 | 154.7 | 134.5 | 87% |
| C. Ex. 3 | 141.3 | 0 | 0% |
| C. Ex. 4 | 130.6 | 0 | 0% |
| C. Ex. 5 | 126 | 0 | 0% |
| C. Ex. 6 | 105 | 0 | 0% |

RC: Reversible Capacity; Capacity retention determined after 11 cycles.

The invention claimed is:

1. An electrode-forming composition comprising:
   (a) at least one fluoropolymer [polymer (F)];
   (b) particles of at least one active electrode material [particles (P)], said particles (P) comprising:
   a core comprising at least one active electrode compound (NMC) of formula (I-B):

$$Li[Li_{x''}(Ni_{P''}Mn_{Q''}Co_{W''})_{1-x''}]O_2 \quad (I\text{-}B)$$

wherein x" is equal to 0, P" is comprised between 0.2 and 0.8, Q" is comprised between 0.1 and 0.4, and W" is comprised between 0.1 and 0.4, with the proviso that the sum (P"+Q"+W") is equal to 1, and
   an outer layer consisting of a metal compound (M), said compound (M) consisting of one or more metals selected from the group consisting of Ni, Cu, Al, Ag and alloys thereof, in their elemental oxidation state, said outer layer at least partially surrounding said core; and
   (c) a liquid medium (L).

2. The electrode-forming composition according to claim 1, wherein polymer (F) is a vinylidene fluoride (VDF) polymer [polymer (VDF)] comprising:
   (aa) at least 50% by moles of recurring units derived from vinylidene fluoride (VDF);
   (bb) optionally, from 0.1% to 20% by moles of a fluorinated monomer different from VDF; and
   (cc) optionally, from 0.1% to 10% by moles, based on the total amount of monomers (aa) and (bb), of at least one hydrogenated monomer.

3. The electrode-forming composition according to claim 2, wherein polymer (F) is a polymer (VDF) comprising recurring units derived from vinylidene fluoride (VDF) and from at least one (meth)acrylic monomer (MA) of formula (II):

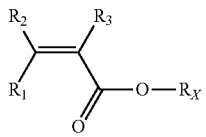

wherein:
   $R_1$, $R_2$ and $R_3$, equal to or different from each other, are independently selected from a hydrogen atom and a $C_1$-$C_3$ hydrocarbon group, and
   $R_x$ is a hydrogen atom or a $C_1$-$C_5$ hydrocarbon moiety comprising at least one hydroxyl group.

4. The electrode-forming composition according to claim 2, wherein polymer (VDF) comprises:
   (aa) at least 80% by moles of recurring units derived from vinylidene fluoride (VDF);
   (bb) optionally, from 0.1% to 10% by moles of a fluorinated monomer different from VDF; and
   (cc) optionally, from 0.1% to 3% by moles, based on the total amount of monomers (aa) and (bb), of at least one hydrogenated monomer.

5. The electrode-forming composition according to claim 2, wherein the fluorinated monomer different from VDF is a fluorinated monomer selected from the group consisting of vinylfluoride (VF1), chlorotrifluoroethylene (CTFE), hexafluoropropene (HFP), tetrafluoroethylene (TFE), perfluoromethylvinylether (MVE), trifluoroethylene (TrFE) and mixtures thereof.

6. The electrode-forming composition according to claim 1, said composition further comprising at least one electroconductivity-imparting additive.

7. The electrode-forming composition according to claim 6, wherein the at least one electroconductivity-imparting additive is selected from the group consisting of carbon black, graphene or carbon nanotubes, metal powders and metal fibers.

8. The electrode-forming composition according to claim 1, wherein medium (L) comprises water.

9. The electrode-forming composition according to claim 1, wherein medium (L) comprises at least one organic solvent (S).

10. A process for manufacturing the electrode-forming composition according to claim 1, said process comprising mixing at least one polymer (F) and the particles (P) in a medium (L), wherein the particles (P) are manufactured by electroless plating.

11. The process according to claim 10, wherein mixing of at least one polymer (F) and particles (P) in a medium (L) is carried out by means of a roll kneader, a mixer, a homo mixer, a ball mixer, or a bead mill.

12. A process for manufacturing a positive electrode, said process comprising:
   (i) applying the electrode-forming composition according to claim 1 onto at least one surface of a current collector thereby providing a film; and
   (ii) drying the film provided in step (i).

13. The process according to claim 12, wherein the electrode-forming composition is applied by a conventional wet coating process selected from the group consisting of screen printing, coating using a roll coater, a blade coater, a slit coater, a curtain coater, a wire coater, a sprayer, a foam applicator and a brush coater.

14. A positive electrode obtainable by the process according to claim 12.

15. An electrochemical device comprising the positive electrode according to claim 14.

16. The electrode-forming composition according to claim 1, wherein P is comprised between 0.2 and 0.4.

17. The electrode-forming composition according to claim 1, wherein P" is comprised between 0.2 and 0.4.

* * * * *